Sept. 9, 1952     T. R. SMITH     2,610,021

VALVE CONSTRUCTION

Filed April 21, 1949     2 SHEETS—SHEET 1

INVENTOR.
Thomas R. Smith
BY Wilkinson, Huxley, Byron Hume
ATTORNEY.

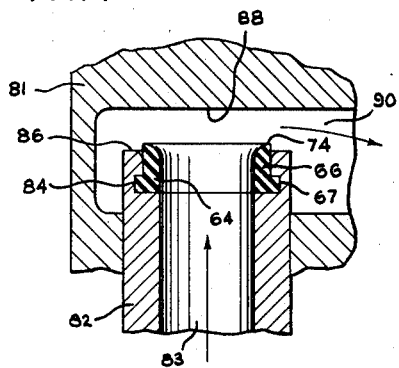

Patented Sept. 9, 1952

2,610,021

UNITED STATES PATENT OFFICE 2,610,021

VALVE CONSTRUCTION

Thomas R. Smith, Newton, Iowa, assignor to The Maytag Company, Newton, Iowa, a corporation of Delaware Application April 21, 1949, Serial No. 88,877

3 Claims. (Cl. 251—27)

1

This invention relates to valve constructions and more particularly to improved valve seals of the self-sealing type therefor.

In the construction of resilient valve sealing elements for liquids incorporating a base and an annular depending rounded sealing lip or a substantially flat sealing lip it has been found that under certain operating conditions when the edge of the sealing lip slowly approaches or leaves the valve seat, or is held in close proximity thereto, the edge of the sealing element starts to vibrate and causes an objectionable noisy or chattering operation which extends back through the water system. This noise is apparently due to vibrations or fluttering set up in the resilient sealing element and may be caused by cavitation on the back of the sealing lip opposite to the direction of liquid flow and/or to the particular flow pattern and pressure of the liquid flowing between the closely spaced sealing lip and seat. When the valve is opened quickly the edge of the sealing lip moves away from the seat at a sufficiently high rate to prevent the chattering or noisy operation from starting. One example of a valve sealing element constructed in the above mentioned manner is disclosed in Thomas R. Smith Patent No. 2,403,028, dated July 2, 1946, and assigned to the assignee of the present invention.

Although seals constructed with a sealing lip having a rounded lower edge equal to approximately one-half the thickness of the depending sealing lip seal satisfactorily, they may, when in their slightly open or "cracked" position, create an objectionable noise with water flowing therethrough under some operating conditions which is dependent to a certain degree upon fluid pressures, temperatures and durometer hardness of the rubber.

Accordingly, it is an object of this invention to provide a valve assembly incorporating a sealing member having a resilient sealing lip for liquids which is contoured to prevent chattering or noisy operation when the valve is in a slightly open position.

It is another object of the invention to provide a valve assembly having a resilient sealing element for liquids which is quiet in operation by providing a sealing lip with a curvature facing in the direction of liquid flow and a relatively sharp corner in the opposite directions.

Other objects, features, capabilities, and advantages are comprehended by the invention as will later appear and as are inherently possessed thereby.

Referring to the drawings:

Figure 1 is a vertical cross-sectional view of a

2 valve for liquids incorporating a resilient valve sealing element constructed in accordance with the present invention;

Figure 6:
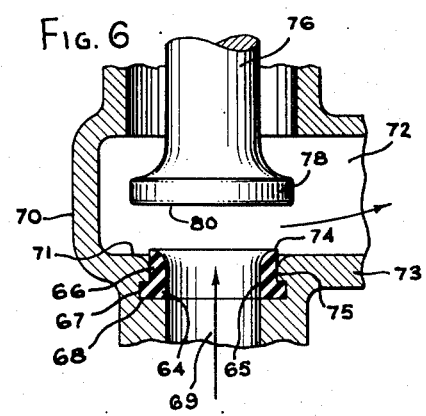

Figures 6 and 7 disclose further modifications of a valve sealing element having a liquid passage therethrough incorporating the features of this invention;

Figure 8 is a modified valve construction in which the sealing element is carried on the outer periphery of a valve stem;

Figure 9 is an enlarged view of a portion of the resilient valve seal showing the sealing lip formed in accordance with this invention and which contour is applicable to the seal constructions shown in Figures 1 to 7 inclusive;

Figure 10 is an enlarged view similar to Figure 9 showing the sealing lip construction disclosed in Figure 8; and Figure 11 is an enlarged view showing a modified form of sealing lip construction.

Figure 1:
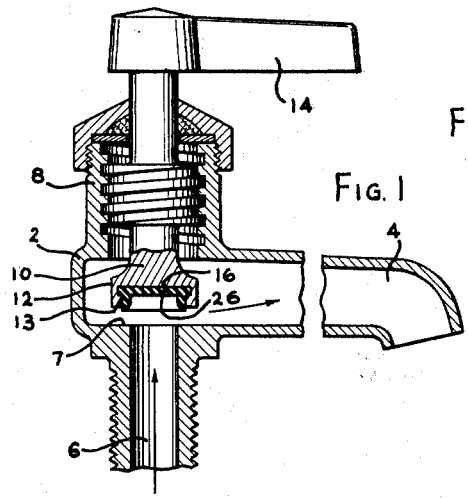
Figure 2:
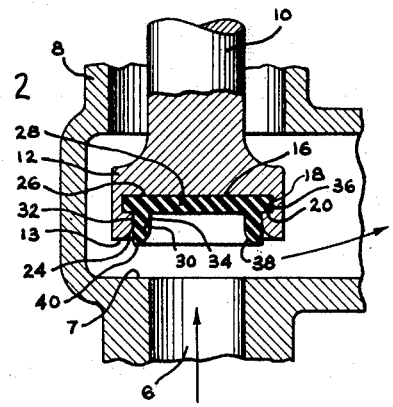
Figure 2 is a partial enlarged view of the valve and sealing element shown in Figure 1.
Figure 3:
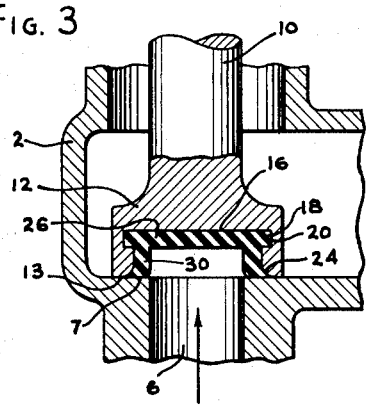
Figure 3 is a view similar to Figure 2, but with the valve in its closed position.

Referring now more in detail to the drawings, an embodiment selected to illustrate the invention is disclosed in Figures 1 to 3 of the drawings as comprising a faucet formed with a body member 2 having a spout or nozzle 4 for the discharge of liquid entering the body member through a passage or inlet 6 with a flat radial valve seat 7 disposed about the inner end of the passage 6. The body is formed in this instance with an upper extension 8 internally threaded in alignment with the passage 6 to receive a threaded valve stem or plunger 10 provided with an enlarged lower end portion 12 having thereon a flat radial bottom abutment surface 13 opposite to and facing the valve seat 7, and a handle 14 connected at its upper end, whereby the plunger may be rotated for moving the same longitudinally into and out of its closed position with respect to the valve seat 7 to cover the passage 6 in the valve body.

The enlarged end 12 of the plunger 10 is provided with a cylindrical shaped recess 16 facing in the direction of the seat 7 and the passage 6, and has an undercut portion 18 to define a radially outwardly extending shoulder 20 disposed inwardly from the abutment surface 13 on the lower end of the plunger. The plunger adjacent the recess is formed annular and the abutment surface 13 is adapted to engage the seat 7 to constitute a positive stop for the plunger when it is moved to its closed position. Also, the corner adjacent the surface 13 and sidewall of the recess 16 is rounded slightly at 24 for a purpose to be hereinafter described.

Disposed within the recess 16 and supported by the lower end of the plunger 12 is a flexible and resilient sealing element 26 of the self-sealing type formed from, for example, rubber or synthetic rubber or the like, and comprising a solid disc-shaped base portion 28 with an integral cylindrical or annular body portion 30 defining a sealing lip depending therefrom and having its lower or free end extending slightly beyond the abutment surface 13. The major portion of the outer wall 32 of the cylindrical portion is disposed adjacent to and supported by the sidewall of the recess 16 and the inner wall portion 34 is positioned to be acted on by the liquid under pressure which acts in a direction to help maintain the sealing element in position. In addition to the action of the liquid under pressure, the base portion of the sealing element 26 is provided with an integral radially extending annular shoulder portion 36 fitting within the under-cut portion 18 of the recess and the shoulders 20 and 36 provided on the sealing element and valve stem holds or prevents the seal from being inadvertently removed from the recess during assembly and under normal operating conditions.

When positioned in the recess the sealing lip 30 is of such shape and length that the free end extends outwardly slightly beyond the abutment surface 13 on the plunger 10, and it and the inner wall 34 which faces the liquid under pressure are curved or relieved at 38 on a radius of curvature R (see Figure 9) preferably substantially equal to the thickness T of the annular sealing lip 30, and the length of the sealing lip is approximately 1½ to 2½ times the thickness T. With a construction of this type the bottom edge or tip of the seal is provided with a relatively resilient and pliable sharp corner 40 adjacent the outer wall 32 of the sealing lip 30, and the corner 40 is preferably rounded very slightly for manufacturing reasons and to provide additional strength at this point. Also, it is to be noted this sharp corner is adjacent the sidewall of the recess 16 and is on the side opposite to the side of the sealing lip 30 from which the liquid is flowing or the low pressure side of the sealing lip 30.

By providing a resilient seal with the bottom edge 40 of the sealing lip contoured in the above mentioned manner it was found, under actual operating conditions, this particular construction apparently improved the flow path of the water through the valve when the valve is in its slightly open or "cracked" position, i. e. when the plunger 10 is positioned so that the bottom edge 40 of the sealing element is no longer under compression or has only been removed from its seat a very slight amount. This improved operation may be due to the fact the pressure of the liquid holds the resilient edge tight against the sidewall of the recess in the plunger and either dampens or prevents it from fluttering or vibrating at a resonant frequency.

In operation, when the plunger 10 is moved toward the seat 7 the free edge 40 of the downwardly projecting sealing lip 30 contacts the seat 7 to stop the flow of liquid through the passage 6, and upon further movement of the plunger 10 in the closing direction the abutment surface 10 on the plunger engages the seat 7 to limit the longitudinal compression upon the sealing lip 30 of the sealing element 26. This compression, plus the pressure of the liquid acting upon the sealing element causes its edge 40 to distort (Figure 3) and fill up the space provided by the rounded corner 24 adjacent the outer wall of the sealing lip, the seat 7 and abutment surface 13 on the plunger to prevent liquid from flowing through the passage, while at the same time the abutting portions of the plunger and seat prevent extrusion of the sealing element.

Figure 4:
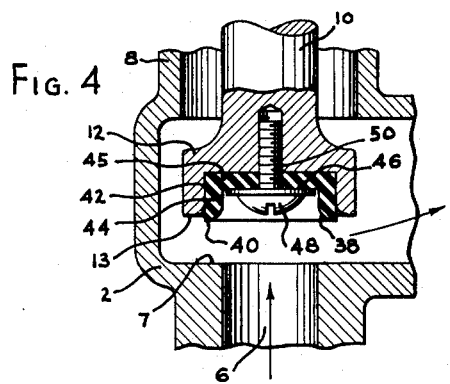
Figure 4 is a view similar to Figure 2 showing a modified form of anchoring means for the sealing element.

The construction shown in Figure 4 is identical in operation to that disclosed and described in Figure 2; however, in this instance the plunger 10 is provided with a straight sided recess 42 for receiving a similarly shaped sealing element 44. The base portion 45 of the sealing element is held or anchored in position by means of a washer 46 and a screw 48 extending therethrough which is threaded in a tapped portion 50 in the bottom of the recess 42.

Figure 5:
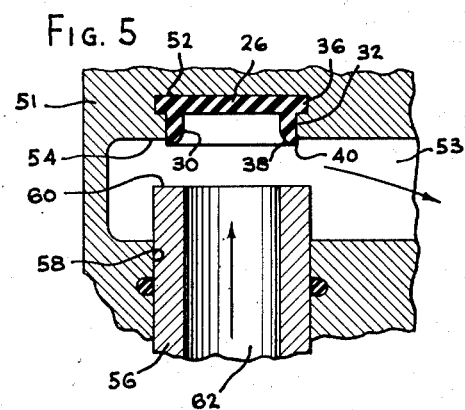
Figure 5 is an enlarged, partial sectional view incorporating the sealing element disclosed in Figure 2 but having the same anchored to the valve body and showing a movable valve seat and liquid passage.

Figure 5 discloses a sealing element construction 26 identical to that shown in Figures 1 to 3; however, in this instance the valve body 51 is provided with an undercut recess 52 opening into a liquid discharge passage 53 leading to a discharge nozzle which is adapted to receive the sealing element 26. The sealing element 26 is supported by the valve body and the free end of the sealing lip 30 thereof projects slightly beyond one wall of the passage 53. This wall provides an abutment surface 54 about the recess 52 to limit the axial compression of the sealing element 26, and the corner formed by the sidewall of the recess and abutment surface is rounded slightly to accommodate the deformed end of the sealing lip. The outer projecting edge 40 of the curved sealing lip 30 extending slightly beyond the abutment surface 54 projects toward a longitudinally movable hollow plunger 56 suitably mounted and sealed in a cylindrical opening 58 in the valve body 51, which may be actuated in any suitable manner. The upper edge of the hollow plunger facing in the direction of the sealing element provides a flat movable annular seat 60 which cooperates with the sealing element 26 to control the liquid flowing through the passage 62 in the plunger toward the nozzle. Also, after the seat contacts the sealing lip, the seat 60 is adapted to engage the abutment surface 54 about the projecting edge 40 of the sealing element to limit the longitudinal compression of the sealing element in a manner identical to the previously described modifications. The shape of the end 40 of the sealing lip and its position with respect to other cooperating parts of the valve correspond to the disclosures of the other modifications and the same performs in a like manner.

In Figure 6 there is shown a further modification of the invention wherein an annular sealing element 64 having a base portion 65, an integral cylindrical sealing lip 66 and an outwardly extending radial shoulder 67 is anchored in an enlarged undercut recess 68 disposed about and forming a part of the discharge end of a liquid passage 69 in a valve body 70. The discharge end of this passage communicates with a space 72 leading to a discharge nozzle 73 in the usual manner and has an abutment surface 71 thereabout having a slightly rounded corner adjacent the sidewall of the recess. The undercut portion of the recess is positioned inwardly from the abutment surface 71 so that when the sealing element 64 is in position its relatively sharp outer edge 74 adjacent the outside wall of the sealing element projects slightly outward beyond the surrounding abutment surface 71, and the sidewall 75 of the recess supports the major portion of the outer wall of the sealing element. Directly opposite and in alignment with the abutment surface 71, sealing element 64 and passage 68 is a longitudinally movable plunger 76 having an enlarged lower end 78 whose bottom surface constitutes a movable valve seat 80, the same being movable toward and away from the sealing element and the abutment surface 71 by any suitable means. When moved in a closing direction the movable seat 80 on the plunger 76 is adapted to first contact the outwardly projecting end portion 74 of the sealing lip 66 to stop the flow of liquid through the passage 69 and upon further movement it engages the abutment surface 71 to limit the longitudinal compression of the sealing lip.

It should be noted that in this construction the annular sealing element 64 is co-axial with the passage 69 and provides a passage for liquid therethrough, and that it is not only held in position by the cooperating shoulders on the sealing element and undercut portion of the recess but also by the pressure of the liquid in the passage acting to maintain a radial outward pressure on the same to hold it in position under all operating conditions. Although the sealing element 64 of this illustrative example of the invention is modified to provide for the flow of liquid therethrough, the structural features thereof and their cooperative relation with other elements of the valve which characterize the invention conform in all respects to the exemplified forms as hereinbefore described.

Figure 7 discloses a modified valve construction having a valve body 81 utilizing a longitudinally movable hollow valve plunger 82 having a passage 83 therethrough for the flow of liquid similar to that disclosed in Figure 5, and which has mounted and supported thereon the sealing element construction 64 shown in Figure 6. In this instance the upper end of the plunger 82 is provided with an undercut recess 84 beneath an annular abutment surface 86 and the sealing element 64 is positioned therein with the outer walls thereof supported by the side wall of the recess and so that its free end 74, which is relieved in the direction of liquid flow to provide a relatively sharp corner, projects upwardly slightly above the abutment surface 86. Disposed opposite the plunger is a valve seat 88 which may be formed as part of the wall structure of a discharge passage 90 in the valve body and, when the plunger is moved in a closing direction, the end 74 of the sealing lip is adapted to contact the seat 88 in the valve body 81 to seal the liquid flowing through passage 83 in the plunger, and upon further movement the abutment surface 86 on hollow plunger 82 engages the valve seat 88 to limit the longitudinal compression on the sealing element. As in the embodiment shown in Figure 6 of the drawings, the corner formed by the side wall of the recess 84 and abutment 86 is rounded slightly to accommodate the deformed end of the sealing lip. Also, as in the modification shown in Figure 6, the liquid pressure is in such direction as to maintain the seal in position under all conditions of operation and the relieved portion of the sealing lip faces in the direction of flow of liquid under pressure to provide for the proper flow characteristics.

In Figure 8 there is shown a valve body 91 wherein the flow of liquid therethrough has been reversed, when compared to the other modifications, and comprises an inlet passage 92, an outlet passage 93 with a valve seat 94 disposed about the inner end of the outlet passage. Mounted in the valve body is a longitudinally movable valve stem 95 having an enlarged lower end 96 disposed opposite the valve seat 94 on the high pressure side of the valve. The bottom of the plunger facing the valve seat 94 and outlet passage 93 provides a flat abutment surface 97, which, when in closed position, covers the passage and engages the seat. The lower portion of the enlargement end 96 is reduced in diameter to provide a sidewall 98 and is undercut inwardly from the abutment surface 97 to provide a shoulder 99.

An annular sealing element construction 100 modified to provide a radially inwardly projecting shoulder and base portion 101 and an integral annular depending sealing lip 102 is mounted on the reduced portion of the longitudinally movable plunger 95 so that the annular sealing element 100 may be snapped in place, the shoulders 99 and 101 on the sealing element and plunger cooperating to maintain the same in position. Also, in this valve construction, the liquid in the inlet passage 92 acts on the outer periphery of the sealing element to hold it in position. As in the other modifications, the lower relieved edge 103 of the sealing lip 102 is formed to project slightly past the bottom abutment surface 97 of the stem which acts as a positive stop to limit longitudinal compression of the sealing lip and thereby prevent damage to and extrusion of the sealing element. The corner formed by the side wall 98 and bottom abutment surface 97 is rounded slightly to accommodate the deformed end of the sealing lip 102.

Since the flow of liquid through the passage 93 in the valve is in the opposite direction, when compared to the previously mentioned passages, the lower edge 103 of the sealing element 100 is rounded or relieved from its outer peripheral wall to provide a relatively sharp corner adjacent its inner wall to provide a flow path which reduces turbulence to a minimum and eliminates chattering and noisy operation when the valve is only opened a very slight amount or "cracked." Although the flow of liquid is reversed and the sealing lip is contoured or relieved opposite to that in the previously described sealing elements the flow characteristics appear to be similar, because the objectionable noise was found to be eliminated when this sealing element construction was utilized. Also, it is to be noted that the inner wall 104 of the sealing lip is disposed adjacent the sidewall 98 on the valve stem and is supported thereby and that the relatively sharp corner of the sealing lip is opposite to the direction of flow.

The construction shown in Figures 9 and 10 are enlarged views which are intended to show generally the flow path of liquid through a valve passage between the sealing lip of a resilient sealing element and valve seat which has been restricted by the plunger and wherein the sealing element has a resilient relatively sharp corner or edge projecting slightly beyond the sidewall of the recess which acts as a support for the same. In Figure 9 the flow is from the inner to the outer side of the seal, as disclosed in Figures 1 to 7 inclusive, and in Figure 10 the flow is in the reverse direction, as disclosed in Figure 8.

In Figure 11 there is shown a portion of a resilient sealing lip construction 107, formed integral with any suitable base construction (not shown), having the major portion of its outer wall 108 supported by the sidewall 109 of a recess formed in a movable plunger 111. The lower end of the plunger has an abutment surface 112 disposed opposite a flat valve seat 113 and a liquid inlet passage 114 similar to that previously described. However, instead of relieving the lower edge and inner wall 115 of the sealing lip 107 in the direction of liquid flow by rounding the same as in the previous embodiments, it is chamfered at approximately 45° adjacent the free end to provide a relatively sharp corner 116 with the outer wall 108 of the sealing lip, and this corner is disposed adjacent the sidewall 109 of the recess and the abutment surface on the plunger. The edge of the sealing lip may be rounded slightly for manufacturing reasons and to strengthen the same in a manner similar to the curved sealing lip. It is, of course, to be understood that the above chamfered sealing lip is applicable to all of the disclosed sealing element constructions.

From the above it can be seen all of the modifications of the resilient valve sealing element are similar in that an annular sealing lip is provided which is either chamfered or rounded on a radius substantially equal to the thickness of the sealing lip and have their depending annular relatively sharp sealing lip projecting outward slightly beyond its supporting or anchoring portion, and this sealing lip is adapted to engage or be engaged by, a seat of any suitable type to cut off the flow of liquid flowing through an opening or passage. After contacting the seat the sealing lip is compressed a predetermined amount until the abutment surface contacts the seat to limit the longitudinal compression of the same to prevent extrusion and damage or crushing of the sealing element.

It was found that by providing a sealing lip which has its sidewall supported on the low pressure side and whose bottom edge is chamfered, as shown in Figure 11, or curved on a radius equal to the cross-sectional thickness of the annular or cylindrical depending sealing lip, as shown in Figures 9 and 10, and positioning the relieved portion (either chamfered or curved) toward the high pressure side of the valve opening, the shape of the passage or flow path is modified to such an extent that when the valve is "cracked," audible vibrations or chattering which may be set up in a water system by other types of sealing lips are eliminated.

While an improved sealing element for liquids has been herein described and upon the drawings are shown illustrated embodiments of the invention, it is to be understood that the invention is not limited thereto but comprehends other constructions, arrangement of parts, details and features without departing from the spirit of the invention.

It is claimed:
1. In a sealing device, the combination of a body member having means providing a passageway for the flow of liquid therethrough, valve means for controlling the flow of liquid through said passageway comprising a longitudinally compressible resilient sealing element of the self-sealing type and a substantially flat radial valve seat relatively movable with respect to each other into cooperative sealing relation, said sealing element comprising a base portion and an annular portion having inner and outer cylindrical faces extending therefrom to provide a sealing end adapted to have sealing engagement with said valve seat, said sealing end and a face of said annular portion being relieved for substantially the entire radial thickness of said annular portion to provide a relatively sharp corner at the other cylindrical face of said annular portion, said corner being disposed on the side of said sealing element opposite to the side from which liquid is flowing through said passageway, rigid supporting means including a cylindrical wall for engaging substantially the entire cylindrical face of said annular portion having the sharp corner to support said annular portion against deflection in the direction of said supporting means, said corner on said sealing element providing initial sealing contact with said seat substantially in line with said cylindrical supporting wall, and a substantially flat abutment surface forming a circular edge with said cylindrical wall disposed adjacent said relatively sharp corner for contacting said valve seat to limit the longitudinal compression of said sealing element in its cooperative seating relation with said valve seat.

2. In a sealing device, the combination of a body member having means providing a passageway for the flow of liquid therethrough, valve means for controlling the flow of liquid through said passageway comprising a longitudinally compressible resilient sealing element of the self-sealing type and a substantially flat radial valve seat relatively movable with respect to each other into cooperative sealing relation, said sealing element comprising a base portion and an annular portion having inner and outer cylindrical faces extending therefrom to provide a sealing end adapted to have sealing engagement with said valve seat, said sealing end and a face of said annular portion being relieved for substantially the entire radial thickness of said annular portion to provide a relatively sharp corner at the other cylindrical face of said annular portion, said corner being disposed on the side of said sealing element opposite to the side from which liquid is flowing through said passageway, rigid supporting means including a cylindrical wall for engaging substantially the entire cylindrical face of said annular portion having the sharp corner to support said annular portion against deflection in the direction of said supporting means, said corner on said sealing element providing initial sealing contact with said seat substantially in line with said cylindrical supporting wall, and a substantially flat abutment surface forming a circular edge with said cylindrical wall disposed adjacent said relatively sharp corner for contacting said valve seat to limit the longitudinal compression of said sealing element in its cooperative seating relation with said valve seat, said cylindrical wall and said abutment surface merging to form a curved marginal edge adapted to accommodate distortion of the sealing end of said annular portion when said sealing element is in seating relation with said valve seat.

3. In a sealing device, the combination of a body member having means providing a passageway for the flow of liquid under pressure therethrough and being provided with a substantially flat radial seating surface, a movable valve plunger including a recess having a cylindrical side wall and opening toward said seating surface, said plunger having an annular abutment surface disposed about said recess in opposed relation to said seating surface and being movable into and out of engagement therewith upon operation of said plunger, a resilient sealing element disposed in said recess for controlling the flow of liquid through said passageway, said sealing element having a base portion secured to said plunger having inner and outer cylindrical faces and a sealing end and an annular portion extending from said base portion with substantially the entire outer face of said annular portion being supported laterally by the side wall of said recess, said annular portion having the sealing end thereof disposed in opposed relation to said seating surface and projecting slightly beyond said abutment surface, said sealing end and the inner face of said annular portion being relieved to provide a relatively sharp corner at the outer face of said annular portion disposed on the side of said sealing element opposite to the side from which liquid is flowing through said passageway to reduce the amplitude of vibration of said sealing end of said resilient sealing element when it is in close proximity to said seat.

THOMAS R. SMITH.

REFERENCES CITED

The following references are of record in the file of this patent:

UNITED STATES PATENTS

| Number | Name | Date |
| --- | --- | --- |
| 2,107,200 | Kennon | Feb. 1, 1938 |
| 2,131,928 | Abegg | Oct. 4, 1938 |
| 2,260,381 | Kennon | Oct. 28, 1941 |
| 2,273,693 | Burks | Feb. 17, 1942 |
| 2,403,028 | Smith | July 2, 1946 |